(12) United States Patent  
Khare et al.

(10) Patent No.: US 7,767,270 B1  
(45) Date of Patent: *Aug. 3, 2010

(54) SELECTIVE FUNCTIONALIZATION OF CARBON NANOTUBES BASED UPON DISTANCE TRAVELED

(75) Inventors: Bishun N. Khare, Fremont, CA (US); Meyya Meyyappan, San Jose, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 1058 days.

This patent is subject to a terminal disclaimer.

(21) Appl. No.: 11/387,503

(22) Filed: Mar. 22, 2006

Related U.S. Application Data

(63) Continuation-in-part of application No. 10/320,698, filed on Dec. 13, 2002, now Pat. No. 7,276,266.

(51) Int. Cl.
*H05H 1/24* (2006.01)

(52) U.S. Cl. ............... 427/535; 427/569; 427/575; 427/576; 427/294; 427/903

(58) Field of Classification Search ........... 427/533, 427/535, 538, 562, 569, 575, 576, 585, 255.24, 427/255.26, 294, 903
See application file for complete search history.

(56) References Cited

U.S. PATENT DOCUMENTS

| | | | |
|---|---|---|---|
| 3,870,610 A | 3/1975 | Baird et al. | 204/165 |
| 5,346,683 A | 9/1994 | Green et al. | 423/447.2 |
| 5,698,175 A | 12/1997 | Hiura et al. | 423/447.1 |
| 6,033,582 A | 3/2000 | Lee et al. | 216/37 |
| 6,167,835 B1 | 1/2001 | Ootera et al. | 118/723 E |

(Continued)

FOREIGN PATENT DOCUMENTS

WO    WO 03-038837    *    5/2003

OTHER PUBLICATIONS

Sun, Ya-Ping, et al., "Functionalized Carbon Nanotubes: Properties and Applications". Acc. Chem. Res. 2002, 35, pp. 1096-1104.*

(Continued)

*Primary Examiner*—Bret Chen
(74) *Attorney, Agent, or Firm*—John F. Schipper; Robert M. Padilla

(57) ABSTRACT

Method and system for functionalizing a collection of carbon nanotubes (CNTs). A selected precursor gas (e.g., $H_2$ or $NH_3$ or $NF_3$ or $F_2$ or $CF_4$ or $C_nH_m$) is irradiated to provide a cold plasma of selected target particles, such as atomic H or F, in a first chamber. The target particles are directed toward an array of CNTs located in a second chamber while suppressing transport of ultraviolet radiation to the second chamber. A CNT array is functionalized with the target particles, at or below room temperature, to a point of saturation, in an exposure time interval no longer than about 30 sec. The predominant species that are deposited on the CNT array vary with the distance d measured along a path from the precursor gas to the CNT array; two or three different predominant species can be deposited on a CNT array for distances d=d1 and d=d2>d1 and d=d3>d2.

33 Claims, 5 Drawing Sheets

U.S. PATENT DOCUMENTS

| | | | |
|---|---|---|---|
| 6,263,830 B1 | 7/2001 | Kamarehi et al. | ... 118/723 MW |
| 6,346,303 B1 | 2/2002 | Shih et al. | ................... 427/571 |
| 6,417,111 B2 | 7/2002 | Nishikawa et al. | .......... 738/710 |
| 6,444,864 B1 | 9/2002 | Knight et al. | ............... 585/241 |
| 6,479,028 B1 | 11/2002 | Kaner et al. | ................ 423/414 |
| 7,109,581 B2 * | 9/2006 | Dangelo et al. | ............. 257/720 |
| 7,273,095 B2 * | 9/2007 | Li et al. | ...................... 165/185 |
| 7,276,266 B1 * | 10/2007 | Khare et al. | ................ 427/533 |
| 7,407,640 B2 * | 8/2008 | Barrera et al. | .......... 423/447.1 |
| 7,459,138 B2 * | 12/2008 | Resasco et al. | .......... 423/447.3 |
| 7,473,436 B1 * | 1/2009 | Khare et al. | ............. 427/248.1 |
| 2002/0197474 A1 | 12/2002 | Reynolds | .................... 428/398 |
| 2003/0048056 A1 * | 3/2003 | Kitamura et al. | ............. 313/311 |
| 2005/0008561 A1 | 1/2005 | Fischer et al. | ............ 423/447.1 |
| 2009/0124705 A1 * | 5/2009 | Meyer et al. | ................. 514/769 |

OTHER PUBLICATIONS

Tasis, Dimitrios, et al., "Soluble Carbon Nanotubes". Chem. Eur. J. 2003, 9, pp. 4000-4008.*

Khabasheshku, V.N., et al., "Functionalized carbon nanotubes and nanodiamonds for engineering and biomedical applications". Diamond and Related Materials, 14 (2005) pp. 859-866.*

Ciraci, S., et al., "Functionalized carbon nanotubes and device applications". J. Phys.: Conden. Matter 16 (2004) R901-R960.*

E. T. Mickelson et. al, "Florination of Single-Wall Carbon Nanotubes," Chem. Phys. Lett. vol. 296, pp. 188-194 (1998).

J. Chen et. al, "Solution Properties of Single-Walled Carbon Nanotubes," Science, vol. 282, pp. 95-98 (1998).

* cited by examiner

SELECTIVE FUNCTIONALIZATION OF CARBON NANOTUBES BASED UPON DISTANCE TRAVELED

This application is a continuation-in-part of application Ser. No. 10/320,698, filed Dec. 13, 2002 now U.S. Pat. No. 7,276,266.

FIELD OF THE INVENTION

This invention is related to addition of functional groups to collections of carbon nanotubes.

BACKGROUND OF THE INVENTION

Carbon nanotubes (CNTs) have attracted much attention, due to their extraordinary mechanical properties and their unique electronic properties. A CNT is topologically equivalent to a two-dimensional graphite sheet rolled into a cylinder, with a cylinder diameter as small as 0.7 nanometers (nm) and with a cylinder length up to several microns (μm). A CNT can be single walled (SW) or multiple walled (MW) and can also be fabricated as a nanofiber or other CNT structure. A CNT can be characterized by its chiral vector components (n,m), which helps determine tube diameter, electronic properties and other properties. Depending upon the chirality (n-m divisible by 3 or otherwise), a CNT can be conducting (metal-like) or semiconducting.

CNTs are being studied for applications in high strength/low weight composites, membranes, mechanical filters, body armor, space suits, electronics, nano-electro-mechanical systems, heat exchange systems, radiators, chemical sensors, physical sensors, actuators, data storage, computers and other applications. In some of these applications, chemical functionalization (addition of one or more specified chemical groups to a basic structure) may be necessary to alter the CNT properties for particular applications. For example, functionalization of the CNT tip or the side walls with suitable probe molecules can provide chemical sensors that recognize certain target species and ignore all others. Development of functional composites may require functionalization of a collection of CNTs to allow the tubes to be dispersed more easily in a host matrix.

An ideal functionalization process should be clean, produce relatively little residue for disposal, should be efficient, selective, and reasonably fast, should be scalable to large scale production, should not require use of complex apparatus to produce the target species or attach the species to the CNTs, and should not require complex chemical processing.

The CNT functionalization process reported in the literature use wet chemical procedures and work with liquids or vapors, to which the CNTs are exposed. An example is use of hot flowing fluorine to attach fluorine atoms to CNTs, as reported by E. T. Michelson et al Chem. Phys. Lett. vol 296 (1998) 188. Large quantities of wet chemicals are often required, with most of the chemicals becoming residues that must be disposed of under hazardous substance guidelines. Recycling of the chemicals used is seldom an option.

What is needed is a CNT functionalization process that is "dry" produces relatively little residue for clean-up, is flexible enough to be used for large numbers of chemical functional groups, is reasonably selective, is scalable, and does not require use of complex apparatus or complex processing to achieve functionalization of a collection of CNTs.

SUMMARY OF THE INVENTION

These needs are met by the present invention, which provides a selective, scalable approach, not involving "wet" chemistry, for functionalization of a collection of CNTs with any of a large class of elements and compounds, including hydrogen, the alkali metals, selected hydrocarbons, selected organic species, and the halogens. Taking hydrogen as an example of a target species, atomic hydrogen is produced by applying a glow discharge to a molecular hydrogen source to provide a cold plasma, and using a strong pressure differential to direct the atomic hydrogen thus produced toward the CNTs. Atomic hydrogen that is not received by the CNTs can be allowed to recombine and can be recovered for another glow discharge cycle.

When a given target molecule, such as $NH_3$ or $CF_4$, is provided as a source for functionalization, the predominant species present will depend, in part, on the distance of separation d between the source and the collection of CNTs that serve as the target. For example, where $N_2$ is the target molecule, at a distance d=1 cm, the predominant molecular components appear to be C≡N and C≡N; and at a distance d=2.5 cm, the predominant molecular components appear to be C—$(NH)_2$ and/or C═$NH_2$. For a distance d≧7 cm in certain situations, little or no functionalization is present, in part because the molecular sub-components provided by the breakup of $N_2$ have recombined and are no longer available to react with the CNT target.

DESCRIPTION OF PREFERRED MODES OF THE INVENTION

Figure 1:
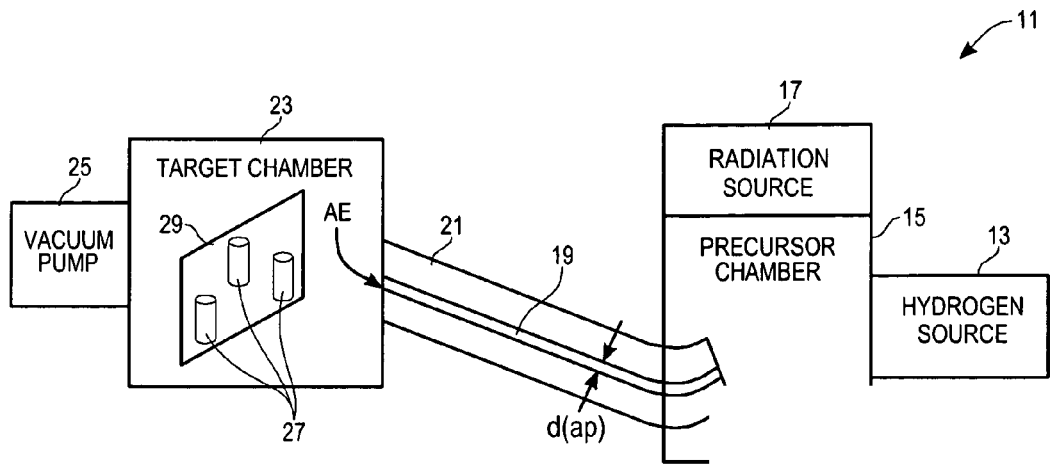
FIGS. 1, 6 and 7 illustrate systems for practicing the invention.

FIG. 1 illustrates a system 11 for practicing the invention to provide hydrogen as the species for functionalization of the CNTs. The system 11 includes a precursor source 13 that feeds hydrogen (e.g., molecular hydrogen, with a purity of 99.9999 percent or better) to a partially evacuated precursor chamber 15. Molecular hydrogen in the precursor chamber 15 is irradiated by a microwave source or other suitable radiation source 17, for example, a McCarroll cavity operating at 2.45 GHz and powered by an Opthos microwave generator. The radiation source 17 provides sufficient radiant energy to produce a cold plasma, in which the free electrons, with typical temperatures $T_e ≈$ a few electron volts (1 eV corresponds to T=11,604 K), are much hotter than the resulting partially ionized gas, which has typical temperatures $T_g ≈ 350$-1000 K.

This discharge produces electrons by ionization and radicals, especially atomic hydrogen as a precursor particle, by dissociation.

Part of the atomic hydrogen thus produced is received in an aperture 19 in a plug 21 of Teflon or other suitable material having an outer diameter of 5-25 mm, where the aperture 19 has a selected diameter (e.g., d(ap)≈1 mm), has a selected length (e.g., 5-25 mm, or greater if desired), and connects the precursor chamber 15 with a target chamber 23 that contains a collection of CNTs 27, assembled in an array on a substrate 29, such as $CaF_2$. The substrate 29 is located adjacent to an aperture exit AE of the aperture 19, is oriented substantially perpendicular to the particle flow direction within the aperture at the aperture exit, and coated with purified CNTs. At appropriate time intervals, the substrate 29 can be removed from the target chamber 23 to harvest the functionalized CNTs and can be replaced by another substrate including non-functionalized CNTs. Purity of the CNTs used here is monitored using transmission electron microscopy, which verifies that troublesome substances, such as Fe nano-particle, are removed by the purification process (described in Khare et al, Nano Lett. vol. 2 (2002) pp. 73-77, incorporated by reference herein).

The precursor chamber 15 and the target chamber 23 are maintained at pressures of 100-1000 µm Hg and 1-10 µm Hg (optionally including an inert carrier gas, such as including $N_2$, Ne or Ar), respectively, so that a large pressure ratio (100:1 to 500:1) exists between the two chambers. This large pressure ratio will encourage most of the atomic hydrogen produced in the precursor chamber 15 to move relatively quickly into and along the aperture 19 and to collide, react with and functionalize the CNTs 27. This functionalization process has been performed at room temperature and at temperatures down to liquid nitrogen temperatures.

Figure 2:
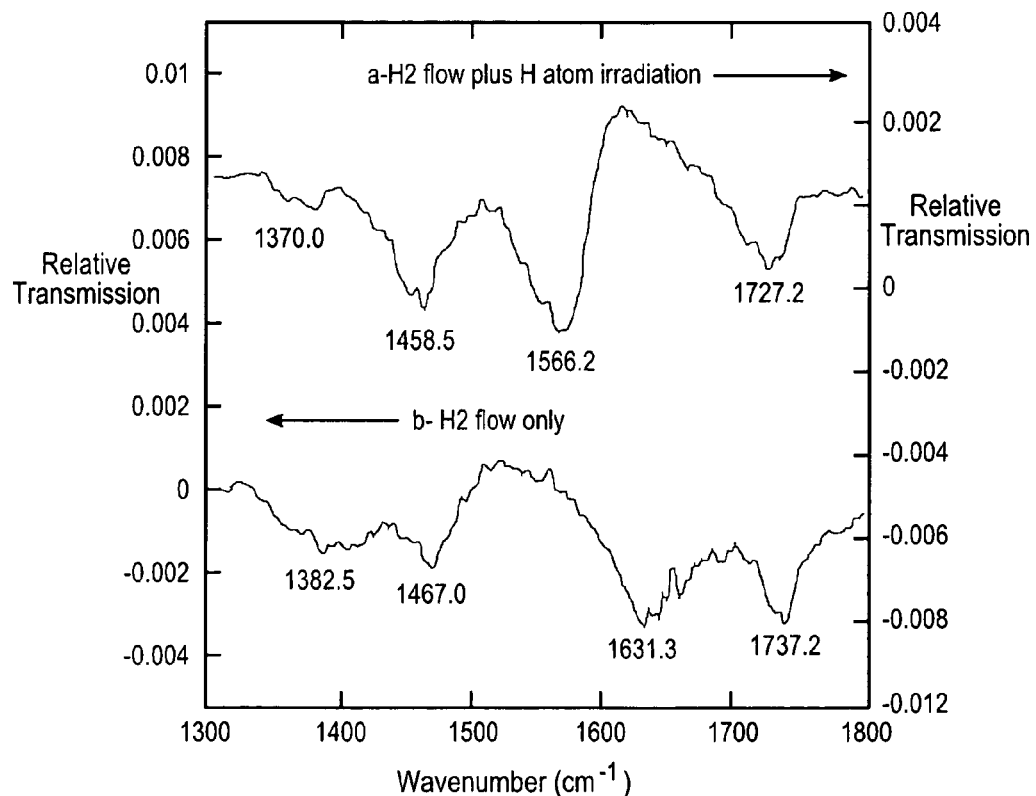
FIG. 2 graphically illustrates FTIR spectra of non-functionalized CNTs. and CNTs functionalized according to the invention.

FIG. 2 shows FTIR spectra for wavenumbers $v'$=1300-1800 $cm^{-1}$, illustrating relative transmission for a CNT array (i) exposed to $H_2$ plus atomic H produced by a glow discharge and (ii) exposed to only $H_2$ (no discharge). C—H bending modes at wavenumbers of about $v'$=1370 $cm^{-1}$ and $v'$=1459 $cm^{-1}$ are manifest in the infrared spectrum curve, as expected from other experimental data. Two other spectral features occur at $v'$=1566 $cm^{-1}$ and $v'$=1727 $cm^{-1}$, which may correspond to C—C vibration in unfunctionalized CNTs and to C=C or C=O vibration in any carbonyl groups that are present. CNTs are known to absorb O atoms and $CH_m$ molecules easily, even at very low pressures, and O atoms and/or $CH_m$ molecules may be present as trace impurities in the hydrogen. The intensities of the extrema in the discharge curve did not change for exposure time intervals of between one and seven hours.

This approach provides substantially complete hydrogen functionalization of an assembly of CNTs, in a time interval as small as 30 sec. This is shown in FIG. 3, which is a graph illustrating variation of infrared absorbance in CNT samples exposed to atomic hydrogen for a selected infrared region ($v'$=2820-3000 $cm^{-1}$) of the spectrum corresponding to C—H stretching bonds in $CH_m$ (m=2, 3).

The CNT samples were exposed for time intervals of 0 sec (control specimen), 30 sec, 90 sec and 300 sec. The absorption values for 30, 90 and 300 sec are substantially the same and are a factor of about 6 higher than the corresponding values for the control specimen, indicating that the hydrogen functionalization of CNTs saturates in an exposure time interval no greater than 30 sec. The absorption differences between the exposure time intervals Δt=30, 90 and 300 sec in FIG. 3 are very small, but each of these absorption levels is much greater than the corresponding absorption value for the control sample level. Further experiments indicate that the hydrogen functionalization of CNTs saturates in a time interval that may be less than 30 sec. Chemisorption of atomic hydrogen onto CNT side walls is a slightly exothermic process, with an estimated energy of about 26 kcal/mole.

Figure 3:
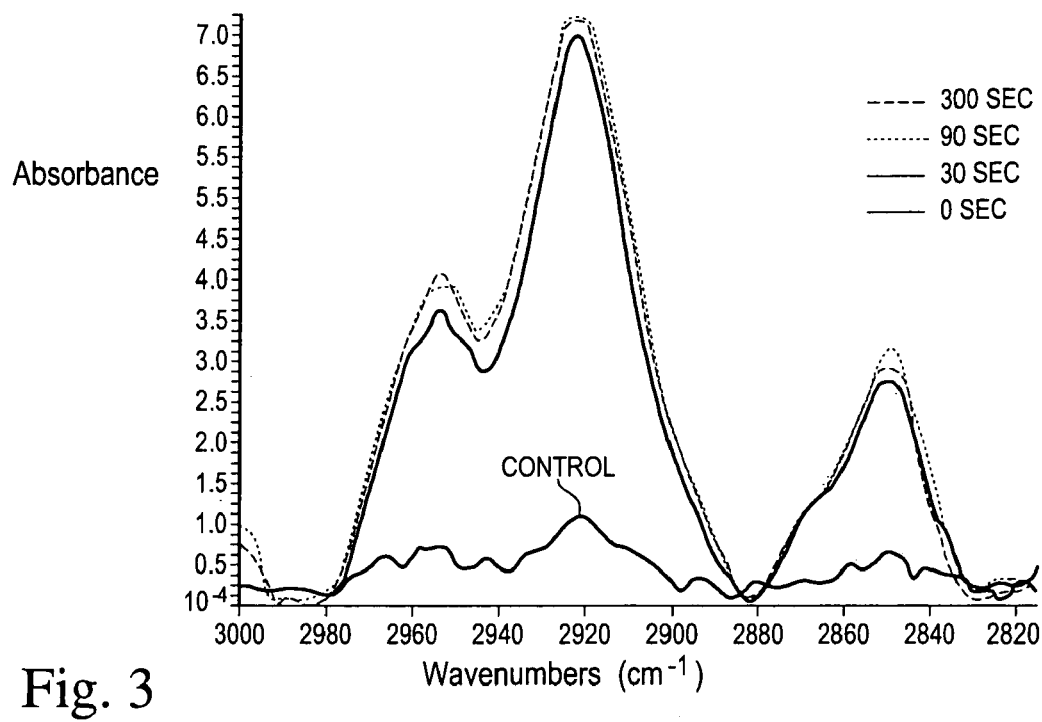
FIG. 3 graphically illustrates saturation of CNT functionalization, using hydrogen, at various times.

FIG. 3 graphically illustrates the FTIR spectra obtained for a control sample (0 sec) and samples exposed for time intervals Δt=30, 90 and 300 sec. The band at $v'$=2924 $cm^{-1}$ (corresponding to a wavelength λ=3.4 µm) arises from C—H stretching bonds and is in reasonable agreement with a computer-modeled value of about $v'$=2900 $cm^{-1}$. The unmodified SWCNTs do not have any infrared (IR) modes near $v'$=2900 $cm^{-1}$, although a small background level of C—H stretching mode is present in the control sample, as shown. As the SWCNTs are exposed to the H atoms, hydrogen functionalization of the nanotubes rapidly saturates, as indicated in the preceding. Subsidiary features at wavenumbers $v'$=2955 $cm^{-1}$, $v'$=2871 $cm^{-1}$, $v'$=2863 $cm^{-1}$, and $v'$=2854 $cm^{-1}$ are typical of C—H stretching modes in $CH_m$ groups, which are present in small amounts in $H_2$ gas, even after liquid nitrogen trapping. Methane ($CH_4$) is known to be easily absorbed onto SWCNTs, and this may contribute to the background manifested by the control sample. Exposure of identical samples of SWCNTs to $H_2$ molecules (no discharge present, but with trace amounts of hydrocarbon impurities) under identical conditions for identical time intervals produced the same peaks, but at peak intensities several orders of magnitude smaller. Therefore, the absorption results in FIG. 3 can be attributed to functionalization of SWCNTs with atomic hydrogen, exposed to the plasma.

Experiments to demonstrate substantial functionalization of single wall CNTs (SWCNTs) with atomic hydrogen have been performed. Molecular hydrogen gas ($H_2$, 99.9999 percent purity) was passed through a liquid nitrogen trap to eliminate water and hydrocarbon impurities, with an $H_2$ pressure of about 500 µm Hg in the precursor chamber 15. The pressure in the CNT chamber 23 was about 1 µm Hg. The $H_2$ precursor gas was irradiated, and a beam of H particles was directed along a central axis CA (FIGS. 6, 7) of the aperture 19 toward an array of SWCNTs on the substrate 29 in the CNT chamber 23. The SWCNTs were produced by the HiPCO process and were purified, as described in the Khare et al article, op cit. The approach extends to other procedures, in addition to HiPCO, for producing SWCNTs and MWCNTs.

Before functionalization with H, the SWCNTs were baked in a vacuum for 30 minutes at a temperature T=810° C. to remove hydrocarbon impurities. A Thermo Nicolet Nexus 670 Fourier transform infrared (FTIR) spectrometer at 4 $cm^{-1}$ resolution and a Perkin Elmer UV-VIS-NIR spectrometer (model Lambda 900) were used to analyze control (non-functionalized) and functionalized SWCNT samples.

Recombination of atomic hydrogen to produce molecular hydrogen, as well as other reactions, will also produce ultraviolet radiation within the precursor chamber 15, and such radiation is known to break C—H bonds in hydrogenated structures such as hydrogenated CNTs. For this reason, the aperture 19 in the plug 21 is aligned with an initial and/or final aperture segment that is curvilinear (referred to herein as "off-axis alignment"), or is otherwise configured so that little or no uv radiation is received by the target chamber 23 from the precursor chamber 15.

Figure 4:
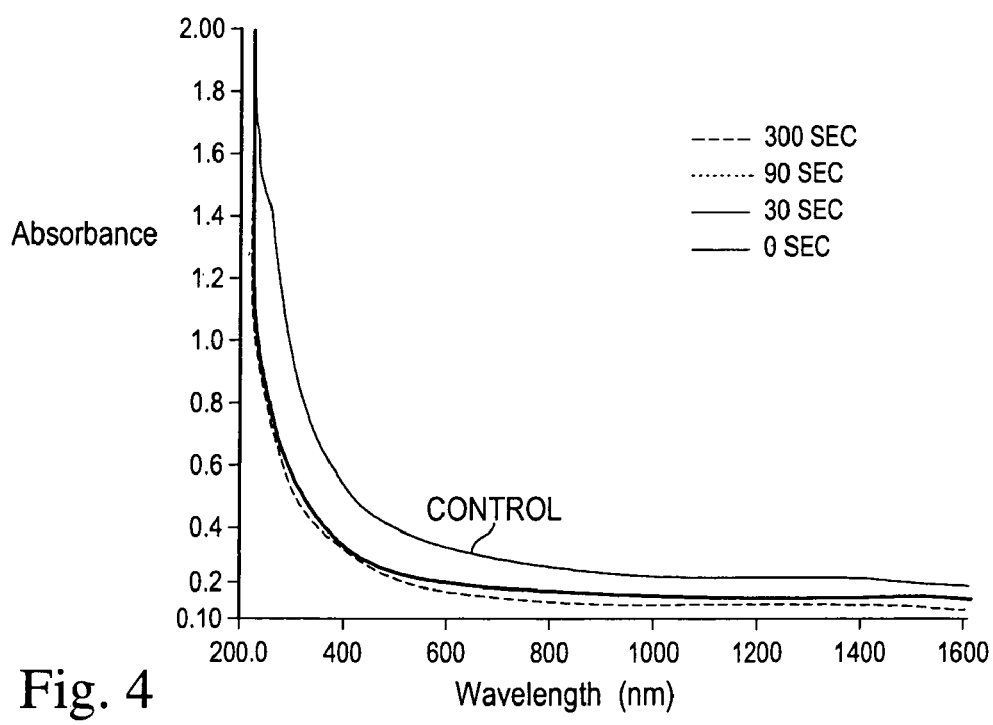
FIG. 4 graphically illustrates absorption of the samples from FIG. 3 in portions of the ultraviolet, visible and infrared spectrum.

Recent theoretical studies by Bauschlicher et al, reported in Nano Lett. vol. 1 (2001) pp. 223 and in Nano Lett. vol. 2 (2002) p. 337, indicate that the maximum hydrogen coverage on the outside of a CNT is about 50 percent, due to $sp^3$ hybridization. Ultraviolet absorption, arising from π→π* excitations in a CNT covered with H atoms, are expected to be reduced to about half the absorption values found for "bare" CNTs with no H atoms present. FIG. 4 shows UV-VIS-NIR absorption data for the same samples as shown in FIGS. 2 and 3. The spectra are featureless for CNTs having varying diameters and bandgaps. The decrease in UV absorption intensity is consistent with decrease in the fraction of C—C n bonds present, as would be expected. These UV-VIS-NIR data are consistent with the IR results of FIG. 3 and supports the hypothesis that the SWCNT data, shown in FIG. 3, indicate substantial functionalization of these CNTs with atomic hydrogen.

This approach uses a glow discharge or cold plasma irradiation of the precursor molecules (here, $H_2$) to provide functionalization of CNTs. The procedure is a clean, low temperature process that requires a relatively small amount of precursor gas (here, $H_2$) and uses relatively high efficiency plasma production. A cold plasma process can be used for production of single species atomic halogens, beginning with a precursor gas such as $F_2$, $Cl_2$, $Br_2$ or $I_2$. A cold plasma process can be used for production of single species atomic alkali metals (single valence), such as Li, Na, K, Rb and Cs. A cold plasma process can also be used for production of low atomic weight hydrocarbons, such as $C_nH_{2n}$, $C_n$—$H_{2n+1}$, and $C_nH_{2n+2}$ (n=1, 2, 3) and for organic species such as dichlorocarbene ($H_2CCl_2$), although the species selectivity here will not be high. The precursor gas can be irradiated using dc, radiofrequency, microwave, or inductive or electron cyclotron resonance (ECR) discharges.

Multiple wall CNTs can also be functionalized using the approaches disclosed here, although it is likely that the outer or exposed layer(s) of CNTs in the initial structure will be the primary sites for such functionalization.

Figure 5:
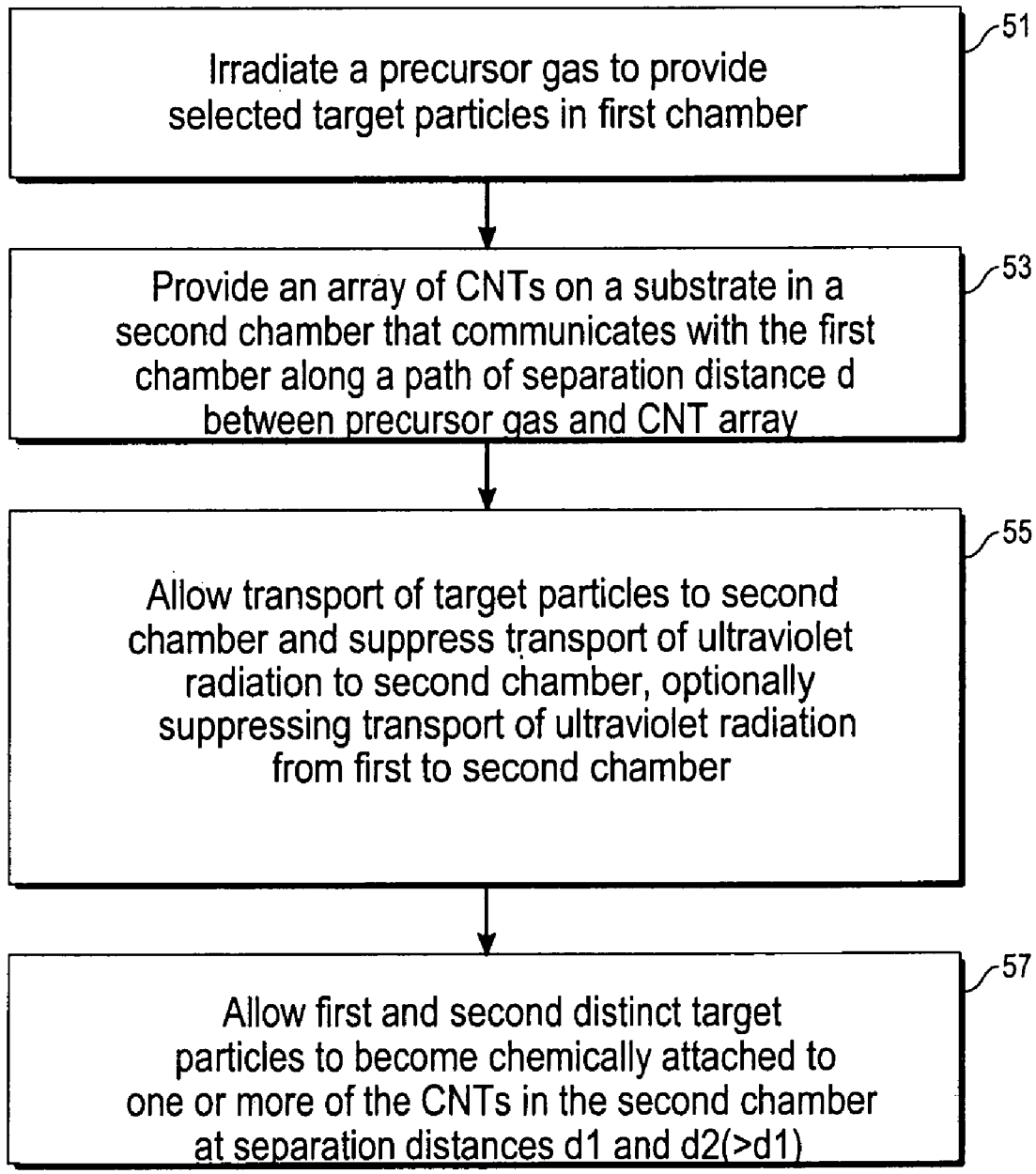
FIG. 5 is a flow chart of a procedure for practicing the invention.

FIG. 5 is a flow chart illustrating a procedure for practicing the invention. In step 51, a selected precursor gas is irradiated to provide selected target particles in a first chamber. In step 53, a collection of CNTs on a selected substrate is provided in a second chamber that is in fluid communication with the first chamber, where one or more selected locations on the substrate are located at a distance d, measured along a path from the precursor gas in the first chamber to the selected location on the substrate in the second chamber. The distance d lies in a selected range, for example, 1 cm≦d≦7 cm, which may vary with the density of the precursor gas and/or with the density of residual gas, if any, in the second chamber. In step 55, transport of target particles from the first chamber to the second chamber is allowed; optionally, the first chamber-to-second chamber communication mechanism is configured to suppress transport of ultraviolet radiation from the first chamber to the second chamber. In step 57, first and second distinct species of target particles are allowed to become chemically attached to one or more CNTs within the second chamber at respective distances d1 and d2, where d1<d2 and d1 and d2 are within the selected range for d.

Figure 6:
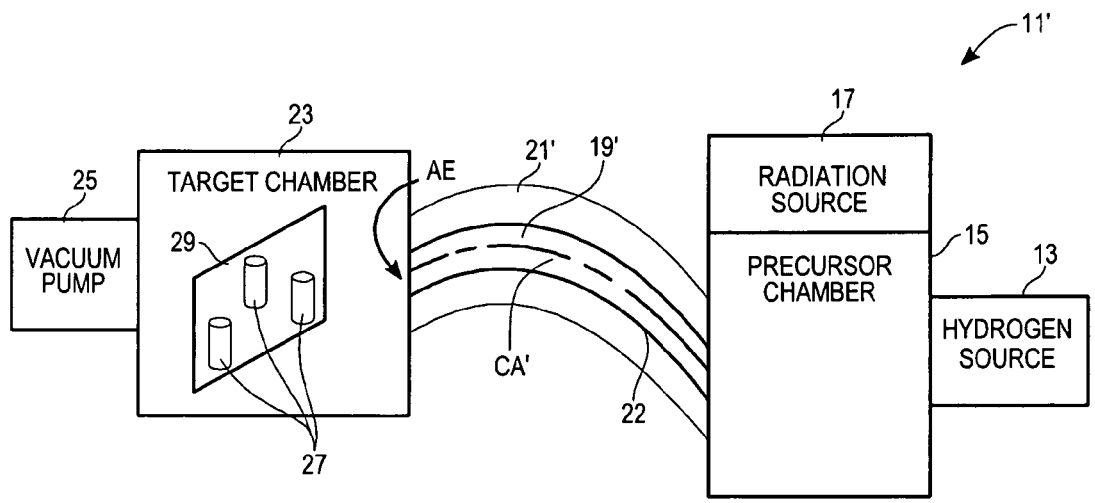

Another method of suppressing transport of uv radiation from the precursor chamber 15 to the target chamber 23 is illustrated in FIG. 6. An elongated aperture 19' in a plug 21' is provided with a curvilinear central axis CA' having substantial curvature, rather than with the linear or straight axis illustrated in FIG. 1, so that no radiation, and more particularly no uv. radiation, can travel in a single straight line in moving from the precursor chamber 15 to the target chamber 23. Optionally, where the aperture axis is linear or curvilinear, part or all of the interior or side walls of the aperture 19' are lined with a substance 22 that absorbs uv radiation and that, in response to such absorption, either (i) does not emit radiation or (ii) emits only radiation at infrared or lower energies that do not cause C—H or C—C bond breakage in CNTs or functionalized CNTs.

Figure 7:
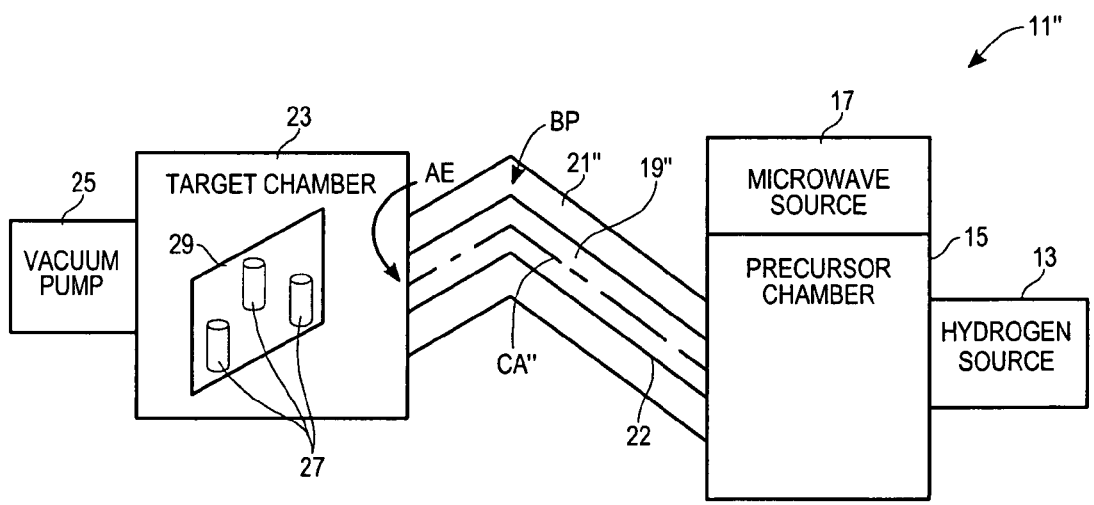

Another method of suppressing transport of uv radiation from the precursor chamber 15 to the target chamber 23 is illustrated in FIG. 7. An elongated aperture 19" is provided with a central axis CA" that includes two or more linear (or curvilinear) segments that are joined together at one or more bend points BP, at each of which the directions of the two contiguous segments are substantially different. With this configuration, no radiation (ultraviolet or otherwise) can travel in a single straight line in moving from the precursor chamber 15 to the target chamber 23. Again, part or all of the interior or side walls of the aperture 19" are lined with a substance 22 that absorbs uv radiation and that, in response to such absorption, either (i) does not emit radiation or (ii) emits only radiation at infrared or lower energies that do not cause C—H or C—C bond breakage in CNTs or functionalized CNTs.

Figure 8B:
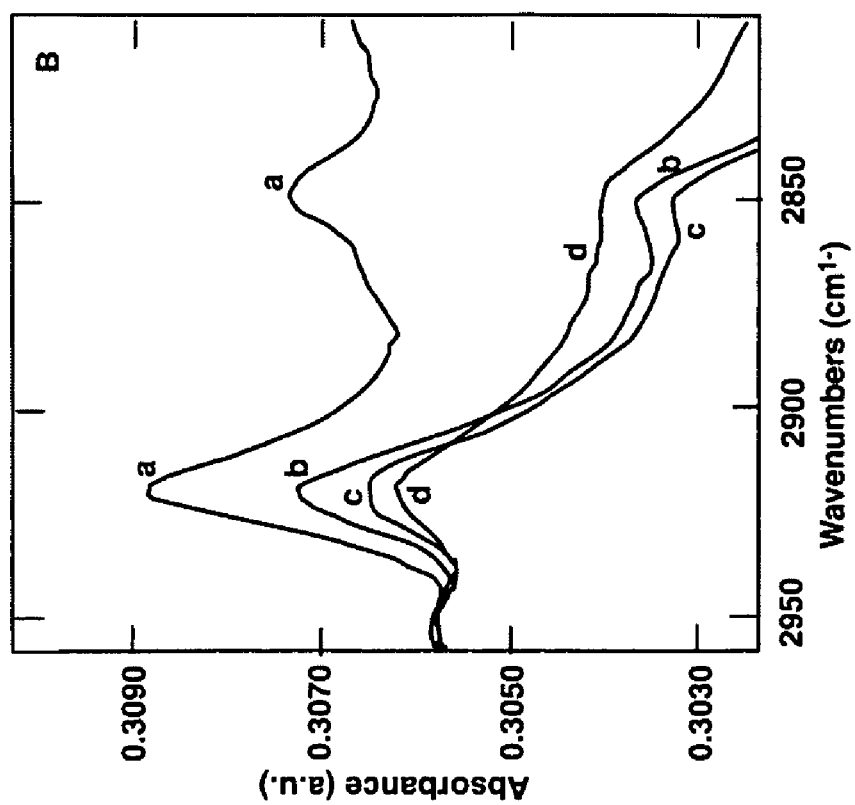
FIGS. 8A and 8B are graphs illustrating FTIR spectra for target molecules deposited on a CNT array located at a distance of 2.5 cm from a precursor gas ($N_2$).
Figure 8A:
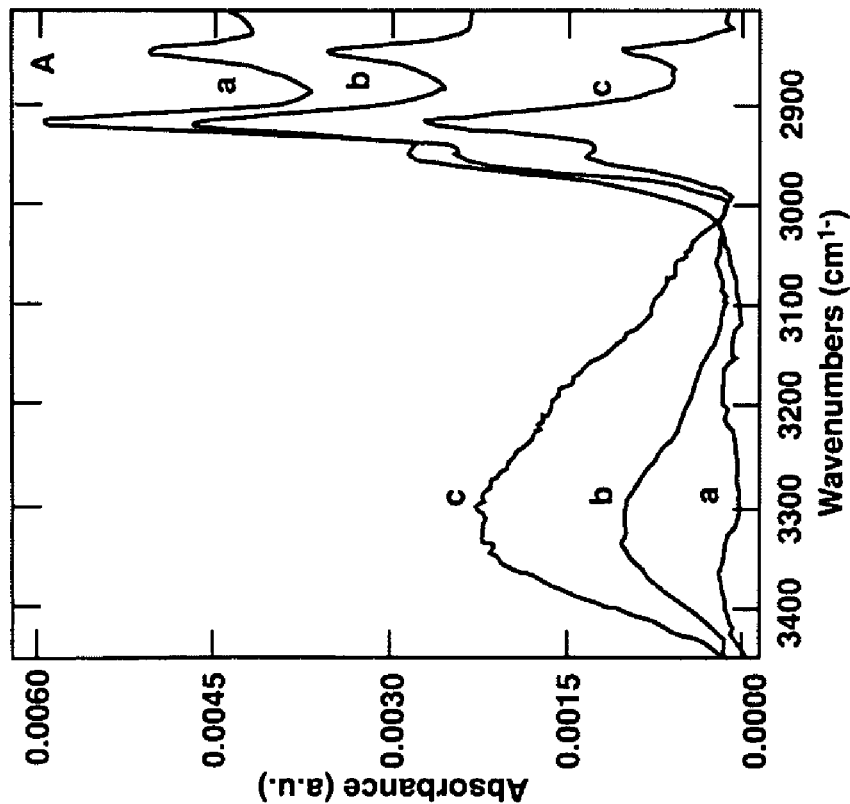

In experiments performed using $N_2$ as the precursor gas, where the distance d1 was arranged to be about 1 cm, the predominant species of target molecule deposited on the CNTs were bands characteristic of C=N and C≡N; and where the distance d2 was about 2.5 cm, the predominant species of target molecules deposited including molecules containing C—$NH_2$ and/or C=N. Residual hydrogen is believed to be responsible for appearance of H in the C—$NH_2$. For distances d at least equal to 7 cm, no deposits arising from the precursor gas could be detected, possibly due to recombination. The precursor gas was present at a pressure in a range of 300-550 mTorr, and a microwave discharge was used to create target molecules in the first chamber. FIGS. 8A and 8B are graphs illustrating FTIR spectra for target molecules deposited on a CNT array located at a distance of 2.5 cm from a precursor gas (here, $N_2$).

In experiments using $NH_3$ as the precursor gas, at precursor chamber pressures of about 180 mTorr, N—H stretching modes, at 3183~3343 $cm^{-1}$, N—$H_2$ bending modes and C=N modes at 1668-1670 $cm^{-1}$, and C=N modes, at 1560-1584 $cm^{-1}$, are observed for separation distance d=1 cm, but no C≡N modes are observed.

In experiments using $CF_4$ as the precursor gas, with estimated bond energies of 2.1-5.4 eV for $CF_4$, $CCl_4$, $CBr_4$, $CI_4$, and $CAt_4$, at precursor chamber pressures in a range 500-1000 mTorr, the observed target molecules deposited on the CNTs were $CF_x$ (x=0.5-2 plus x=4). At a distance d1=1 cm, the CNT array was merely etched by the activated precursor gas, through chemical reactions after about 300 sec of discharge. At distances d at least equal to 7 cm, species C—F and $CF_4$ were detected (at 1282 $cm^{-1}$). Initially observed (residual) C—H band intensities decreased with increasing time, likely due to displacement of the H component with plasma species.

This approach can also be applied to functionalize a nanostructure using a halogen, such as F, Cl, Br, I or At or a mixture thereof, beginning with $F_2$, $Cl_2$, $Br_2$, $I_2$, or $At_2$, with estimated bond energies of 1.5-2.0 eV, to form activated or excited initial products such as F*, Cl*, Br* I* or At* that will react and combine with C in a CNT array. Again, the predominant reaction product(s), such as C—F or C—Cl, at a given CNT array location will vary with the separation distance, d≈d1 or d≈d2 or d≈d3 (d1<d2<d3) between the location where the precursor is activated and the CNT array location. Where a mixture of functionalizing halogens, such as C—F and C—Br, is desired in a functionalized CNT array, one or more precursors, drawn from the inter-halogen group F—Cl, F—Br, F—I, F—At, Cl—Br, Cl—I, Cl—At, Br—I, Br—At or I—At, with estimated bond energies of 1.8-2.5 eV, can be provided as part or all of the precursor gas in the chamber 15. The radiation energies needed for production of the activated or excited initial products (e.g., F*, Cl*, Br*, I* or At*) are estimated to be somewhat lower than, but of the same order of magnitude as. the energies needed to produce C=N or C—(NH$_x$)$_{2-x}$. Use of a halide (HF, HCl, HBr HI or HAt as a precursor gas will produce one or more of a first group of reaction products, such as $CH_w$ (w=1, 2, 3, 4), at one separation distance d1, a second group, such as $CN_x$ (x=1, 2, 3), at a second separation distance d2, and a third group, such as C—(N—H$_y$)$_{2-y}$ (y=1, 2), at a third separation distance d3. This last approach is useful if more than one of these three groups of reaction products is needed for one, two or more applications.

This approach can also be used to functionalize a nanostructure using a precursor having a structure similar to $NH_3$, such as $NF_3$, $NCl_3$, $NBr_3$, $NI_3$ or $NAt_3$. Where, for example, $NF_3$ is used, N—F stretching modes, N—$F_2$ bending modes and C=N modes will likely appear for a suitable small separation distance, such as d=1 cm, but no C=N modes are likely to be observed. Where the separation distance d is 7 cm or larger, N+N recombination occurs, and only F atoms, but no N atoms, remain for functionalization of the CNT array at these distances. This will also occur where $NCl_3$, $NBr_3$, $NI_3$ or $NAt_3$ is provided as the precursor gas.

*In general, it is preferable to provide separate CNT arrays at two or more different separation distances d corresponding to different desired dominant functionalization species. If two different functionalization species are to be provided, at the same distance or at different distances d, this can be achieved by either of at least two approaches: (i) locate first and second CNT arrays at first and second different distances, d=d1 and d=d2, respectively, in a single target chamber and (ii) locate first and second CNT arrays at first and second different distances, d=d1 and d=d2, respectively, in first and second target chambers.

What is claimed is:

1. A method for functionalizing a collection of carbon nanotubes (CNTs), the method comprising:
   irradiating a precursor gas to provide selected first target particles that contain N in a first chamber having a first selected sub-Torr chamber pressure p1;
   providing a collection of first target CNTs on a substrate in a second chamber having a second selected sub-Torr pressure p2, where p2 is not more than about 0.01·p1;
   providing a particle communication mechanism that allows transport of at least a portion of the first target particles from the first chamber to the second chamber;
   allowing at least one first target particle to react with and become chemically attached to at least one first target CNT in the second chamber; and
   choosing a distance of transport d, of the at least one first target particle that is irradiated in the first chamber to at least one first target CNT in the second chamber, to lie in a first transport distance range, d<d1, where d1 is selected to increase a likelihood that the reaction product of the at least one first target particle and the at least one first target CNT will be one of a group of one or more target reaction products that differs from the first target CNT.

2. The method of claim 1, further comprising choosing said first target particle and said first target CNT so that said reaction products include at least one of C=N, C≡N, C—$NH_2$, C—NH and C—(NH)$_2$.

3. The method of claim 1, further comprising choosing said first target particles to include at least one of $NH_3$ and $N_2$.

4. The method of claim 1, further comprising configuring said particle communication mechanism so that transport of ultraviolet radiation from said first chamber to said second chamber is suppressed or eliminated.

5. The method of claim 4, wherein said transport of said ultraviolet radiation from said first chamber to said second chamber is suppressed by providing an elongated aperture, having an aperture central axis and an aperture side wall and connecting said first and second chambers, further comprising arranging the aperture according to at least one of the following: (i) the aperture central axis is aligned off-axis so that little or no ultraviolet radiation that is produced within said first chamber can move in a single straight line from said first chamber to said second chamber, (ii) the aperture central axis is curvilinear, and is provided with sufficient curvature so that substantially no ultraviolet radiation that is produced within said first chamber can move in a single straight line from said first chamber to said second chamber, and (iii) the aperture central axis has at least one bend point at which a direction of the central axis changes abruptly so that substantially no ultraviolet radiation that is produced within said first chamber can move in a single straight line from said first chamber to said second chamber.

6. The method of claim 5, further comprising providing at least a portion of said aperture side wall with a chemical substance (i) that absorbs said ultraviolet radiation and emits no radiation in response thereto or (ii) that absorbs said ultraviolet radiation and, in response thereto, emits radiation having an emitted energy that is lower than required to cause a bond breakage in at least one of a C—C bond and a C—H bond.

7. The method of claim 1, further comprising choosing said first target particles from a group of target particle species consisting of H, Li, Na, K, Rb, Cs, F, Cl, Br, I, At, dichlorocarbene, $C_nH_{2n}$, $C_nH_{2n+1}$ and $C_nH_{2n+2}$, with n=1, 2 and 3.

8. The method of claim 1, wherein said step of irradiating said precursor gas comprises irradiating said precursor gas with at least one of a dc source, a radiofrequency source, a microwave source and an induction source of radiation to provide a cold plasma.

9. The method of claim 1, further comprising choosing said pressure p2 in a range 1 μm Hg≦p2≦10 μm Hg.

10. The method of claim 1, further comprising allowing said at least one first target particle to become chemically attached to said at least one first target CNT in said second chamber in an exposure time interval no longer than about 30 sec.

11. The method of claim 1, further comprising allowing said at least one first target particle to become chemically attached to said at least one first target CNT at a temperature in said second chamber that is no greater than about room temperature.

12. The method of claim 1, further comprising choosing said distance d1 to be about 1 cm.

13. The method of claim 1, further comprising:
   allowing at least a second target particle to react with and become chemically attached to at least a second target CNT in said second chamber,
   where a distance of transport d' of the second target particle that is irradiated in said first chamber to the second target CNT in said second chamber is chosen to lie in a second transport distance range, d1<d'<d2, where the value d2 is selected to increase a likelihood that a second reaction product of the second target particle and the second target CNT will be one of a group of at least one target reaction products that differs from said first target CNT and from said first reaction product.

14. The method of claim 13, further comprising choosing said pressure p1 in a range 100 µm Hg≦p1≦1000 µm Hg.

15. The method of claim 14, further comprising choosing said distance d1 to be about 1 cm and choosing said distance d2 to be about 7 cm.

16. The method of claim 13, further comprising choosing said distance d1 to be about 1 cm and choosing said distance d2 to be about 2.5 cm.

17. A method for functionalizing a collection of carbon nanotubes (CNTs), the method comprising:
   irradiating a precursor gas to provide selected first target particles that contain at least one of F, Cl, Br, I and At in a first chamber having a first selected sub-Torr chamber pressure p1;
   providing a collection of first target CNTs on a substrate in a second chamber having a second selected sub-Torr pressure p2, where p2 is not more than about 0.01·p1;
   providing a particle communication mechanism that allows transport of at least a portion of the first target particles from the first chamber to the second chamber;
   allowing at least one first target particle to become chemically attached to at least one first target CNT in the second chamber; and
   choosing a distance of transport d, of the at least one first target particle that is irradiated in the first chamber to a first target CNT in the second chamber, to lie in a first transport distance range, d<d1, where d1 is selected to increase a likelihood that the reaction product of the first target particle and the first target CNT will be one of a group of at least one target reaction products that differs from the first target CNT.

18. The method of claim 17, further comprising choosing said first target CNT so that said reaction products include at least one of $C-F_2$, $C-Cl_2$, $C-Br_2$, $C-I_2$, and $C-At_2$.

19. The method of claim 17, further comprising choosing said first target particles to include at least one of $C-F_4$, $C-Cl_4$, $C-Br_4$, $C-I_4$, and $C-At_4$.

20. The method of claim 17, further comprising configuring said particle communication mechanism so that transport of ultraviolet radiation from said first chamber to said second chamber is suppressed or eliminated.

21. The method of claim 20, wherein said transport of said ultraviolet radiation from said first chamber to said second chamber is suppressed by providing an elongated aperture, having an aperture central axis and an aperture side wall and connecting said first and second chambers, further comprising arranging the aperture according to at least one of the following: (i) the aperture central axis is aligned off-axis so that little or no ultraviolet radiation that is produced within said first chamber can move in a single straight line from said first chamber to said second chamber, (ii) the aperture central axis is curvilinear, and is provided with sufficient curvature so that substantially no ultraviolet radiation that is produced within said first chamber can move in a single straight line from said first chamber to said second chamber, and (iii) the aperture central axis has at least one bend point at which a direction of the central axis changes abruptly so that substantially no ultraviolet radiation that is produced within said first chamber can move in a single straight line from said first chamber to said second chamber.

22. The method of claim 20, further comprising providing at least a portion of said aperture side wall with a chemical substance (i) that absorbs said ultraviolet radiation and emits no radiation in response thereto or (ii) that absorbs said ultraviolet radiation and, in response thereto, emits radiation having an emitted energy that is lower than required to cause a bond breakage in at least one of a C—C bond, a C—F bond, a C—Cl bond, a C—Br bond, a C—I bond and a C—At bond.

23. The method of claim 17, further comprising:
   allowing at least a second target particle to react with and become chemically attached to at least a second target CNT in said second chamber,
   where a distance of transport d' of the second target particle that is irradiated in said first chamber to the second target CNT in said second chamber is chosen to lie in a second transport distance range, d1<d'<d2, where the value d2 is selected to increase a likelihood that a second reaction product of the second target particle and the second target CNT will be one of a group of at least one target reaction products that differs from said first target CNT and from said first reaction product.

24. The method of claim 23, further comprising choosing said distance d1 to be about 1 cm and choosing said distance d2 to be about 2.5 cm.

25. The method of claim 23, further comprising choosing said distance d1 to be about 1 cm and choosing said distance d2 to be about 7 cm.

26. A method for functionalizing a collection of carbon nanotubes (CNTs), the method comprising:
   irradiating a precursor gas to provide selected first target particles that contain at least one of $NF_x$, $NCl_x$, $NBr_x$, $NI_x$, and $NAt_x$ (x=1, 2, 3) in a first chamber having a first selected sub-Torr chamber pressure p1;
   providing a collection of CNTs on a substrate in a second chamber having a second selected sub-Torr pressure p2, where p2 is not more than about 0.01·p1;
   providing a particle communication mechanism that allows transport of at least a portion of the first target particles from the first chamber to the second chamber;
   allowing at least one of the first target particles to become chemically attached to at least one of the first target CNT in the second chamber; and
   choosing a distance of transport d, of the at least one first target particle that is irradiated in the first chamber to a first target CNT in the second chamber, to lie in a first transport distance range, d<d1, where d1 is selected to increase a likelihood that the reaction product of the first target particle and the first target CNT will be one of a group of at least one target reaction products that differs from the first target CNT.

27. The method of claim 26, further comprising choosing at least one of said first target particle and said first target CNT so that said reaction products include at least one of $CF_a$ (a=1, 2, 3), $CCl_b$ (b=1, 2, 3), $CBr_c$ (c=1, 2, 3), $CI_d$ (d=1, 2, 3) and $CAt_e$ (e=1, 2, 3).

28. The method of claim 27, further comprising configuring said particle communication mechanism so that transport of ultraviolet radiation from said first chamber to said second chamber is suppressed or eliminated.

29. The method of claim 28, wherein said transport of said ultraviolet radiation from said first chamber to said second chamber is suppressed by providing an elongated aperture, having an aperture central axis and an aperture side wall and connecting said first and second chambers, further comprising arranging the aperture according to at least one of the following: (i) the aperture central axis is aligned off-axis so that little or no ultraviolet radiation that is produced within said first chamber can move in a single straight line from said first chamber to said second chamber, (ii) the aperture central axis is curvilinear, and is provided with sufficient curvature so that substantially no ultraviolet radiation that is produced within said first chamber can move in a single straight line from said first chamber to said second chamber, and (iii) the aperture central axis has at least one bend point at which a direction of the central axis changes abruptly so that substantially no ultraviolet radiation that is produced within said first chamber can move in a single straight line from said first chamber to said second chamber.

30. The method of claim 29, further comprising providing at least a portion of said aperture side wall with a chemical substance (i) that absorbs said ultraviolet radiation and emits no radiation in response thereto or (ii) that absorbs said ultraviolet radiation and, in response thereto, emits radiation having an emitted energy that is lower than required to cause a bond breakage in at least one of a C—C bond, a C—F bond, a C—Cl bond, a C—Br bond, a C—I bond and a C—At bond.

31. The method of claim 26, further comprising:
allowing at least a second target particle to react with and become chemically attached to at least a second target CNT in said second chamber,
where a distance of transport d' of the second target particle that is irradiated in said first chamber to the second target CNT in said second chamber is chosen to lie in a second transport distance range, $d1<d'<d2$, where the value $d2$ is selected to increase a likelihood that a second reaction product of the second target particle and the second target CNT will be one of a group of at least one target reaction products that differs from said first target CNT and from said first reaction product.

32. The method of claim 31, further comprising choosing said distance $d1$ to be about 1 cm and choosing said distance $d2$ to be about 2.5 cm.

33. The method of claim 32, further comprising choosing said distance $d1$ to be about 1 cm and choosing said distance $d2$ to be about 7 cm.

* * * * *